US012150191B2

United States Patent
Kurose et al.

(10) Patent No.: US 12,150,191 B2
(45) Date of Patent: Nov. 19, 2024

(54) COMMUNICATION DEVICE, COMMUNICATION SYSTEM, COMMUNICATION METHOD, AND MEDIUM HAVING COMMUNICATION PROGRAM STORED THEREON

(71) Applicant: NINTENDO CO., LTD., Kyoto (JP)

(72) Inventors: Sho Kurose, Kyoto (JP); Takayuki Shibata, Kyoto (JP); Satoshi Miyamoto, Kyoto (JP); Yoshitaka Imura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 307 days.

(21) Appl. No.: 17/483,392

(22) Filed: Sep. 23, 2021

(65) Prior Publication Data

US 2022/0174767 A1   Jun. 2, 2022

(30) Foreign Application Priority Data

Nov. 30, 2020 (JP) ................................ 2020-198001

(51) Int. Cl.
  *H04W 76/15*      (2018.01)
  *H04W 52/02*      (2009.01)
  *H04W 72/0446*    (2023.01)

(52) U.S. Cl.
  CPC ....... *H04W 76/15* (2018.02); *H04W 52/0235* (2013.01); *H04W 72/0446* (2013.01)

(58) Field of Classification Search
  CPC ............. H04W 76/15; H04W 52/0235; H04W 72/0446

(Continued)

(56) References Cited

U.S. PATENT DOCUMENTS

2007/0008922 A1   1/2007   Abhishek et al.
2008/0096572 A1*  4/2008   Hsu ....................... H04W 48/16
                                                             455/450

(Continued)

FOREIGN PATENT DOCUMENTS

CN    103765975 A  *  4/2014   ........... H04L 45/124
EP    1 760 958 A2    3/2007

(Continued)

OTHER PUBLICATIONS

"Wi-Fi Peer-to-Peer (P2P)Technical Specification Version 1.4", Wi-Fi Simple Config Wifi Alliance WiFi Peer-too Per (P2P) Technical Specification, Mar. 21, 2014, pp. 24-28, 56-57 and 89.

*Primary Examiner* — Faisal Choudhury
(74) *Attorney, Agent, or Firm* — Scully, Scott, Murphy & Presser, P.C.

(57) ABSTRACT

A communication device that establishes connection to an access point is configured to perform processing for establishing connection to the access point and communicating data with the access point through a first communication channel, processing for notifying the access point of suppression of data communication, processing for data communication for a predetermined period through a second communication channel after the notification of suppression of data communication, processing for resuming data communication with the access point through the first communication channel after data communication through the second communication channel, and processing for determining timing to perform processing for data communication through the second communication channel.

24 Claims, 11 Drawing Sheets

(58) Field of Classification Search
USPC .......................................................... 370/311
See application file for complete search history.

(56) References Cited

U.S. PATENT DOCUMENTS

| | | | |
|---|---|---|---|
| 2008/0201109 A1* | 8/2008 | Zill .................... | H04L 41/5009 |
| | | | 702/186 |
| 2011/0038311 A1 | 2/2011 | Marin et al. | |
| 2017/0019837 A1* | 1/2017 | Katar ................ | H04W 36/0094 |
| 2017/0291105 A1 | 10/2017 | Kondo et al. | |
| 2018/0288698 A1* | 10/2018 | Ginsburg .......... | H04W 52/0216 |
| 2019/0235801 A1 | 8/2019 | Shimazaki | |
| 2021/0392705 A1* | 12/2021 | Jeong .................. | H04W 76/12 |

FOREIGN PATENT DOCUMENTS

| | | |
|---|---|---|
| JP | 2009500969 A | 1/2009 |
| JP | 2017191966 A | 10/2017 |
| JP | 2019134270 A | 8/2019 |
| KR | 10-2011-0011955 A | 2/2011 |

\* cited by examiner

COMMUNICATION DEVICE, COMMUNICATION SYSTEM, COMMUNICATION METHOD, AND MEDIUM HAVING COMMUNICATION PROGRAM STORED THEREON

This nonprovisional application is based on Japanese Patent Application No. 2020-198001 filed with the Japan Patent Office on Nov. 30, 2020, the entire contents of which are hereby incorporated by reference.

FIELD

The present disclosure relates to a communication device that can establish connection to an access point, a communication system including the communication device, a communication method in the communication device, and a communication program for implementing, the communication device.

BACKGROUND AND SUMMARY

In typical wireless communication, a wireless network is configured among a plurality of communication devices. In connection with communication over a plurality of wireless networks, a game system has been known, in which, even when specific game devices form a communication group and communicate with one another, other game devices present within a range where they can receive a frame broadcast from that communication group can obtain various types of information such as information on progress of a game application executed in the communication group.

A configuration that allows data communication between a communication device connected to any access point and a communication device not connected to that access point in a more simplified procedure has been demanded.

An exemplary embodiment provides a communication device that can establish connection to an access point. The communication device is configured to perform processing for establishing connection to the access point and communicating data with the access point through a first communication channel, processing for notifying the access point of suppression of data communication, processing for data communication for a predetermined period through a second communication channel after the notification of suppression of the data communication, processing for resuming data communication with the access point through the first communication channel after data communication through the second communication channel, and processing for determining timing to perform processing for data communication through the second communication channel.

According to this configuration, notification of suppression of data communication is given so as to maintain a state of connection to the access point through the first communication channel and then data is communicated through the second channel. Therefore, processing for disconnection and connection again through the first communication channel does not have to be performed and processing involved with communication can be simplified. Since an attempt to maintain connection to the access point is made, stabilization of data communication can also be ensured.

The notification of suppression of the data communication may include notification of a PowerSave mode. According to this configuration, since communication processing can be performed by making use of a communication procedure defined in the standards, the communication processing can readily be performed by using a general-purpose device.

The timing to perform processing for data communication through the second communication channel may randomly be determined every predetermined cycle time. According to this configuration, since data can be communicated through the second communication channel every predetermined cycle time without fail, management of frequency or the like of data communication through the second communication channel can be facilitated.

The timing may be determined such that processing for data communication through the second communication channel is performed with an interval. According to this configuration, a factor for disconnection between the communication device and the access point can be reduced.

The communication device may be further configured to receive, when data to be transmitted to the communication device through the first communication channel is buffered at the access point during data communication through the second communication channel, the buffered data during a period from after data communication through the second communication channel until start of next data communication through the second communication channel. According to this configuration, possibility of buffer overflow at the access point can be lowered.

A length of the predetermined cycle time and/or a length of the predetermined period may be adjusted in accordance with at least one of a communication condition and communication performance. According to this configuration, frequency or the like of occurrence of data communication through the second communication channel can be optimized, for example, in accordance with an amount of data exchanged between the access point and the communication device through the first communication channel.

The communication device may be configured to further perform, when the communication device receives data from another communication device through the second communication channel, processing for establishing connection to that another communication device. According to this configuration, so long as another communication device is found through the second communication channel, data can be communicated also to that another communication device through the second communication channel while data communication through the first communication channel is maintained.

The communication device may be configured to further perform processing for sharing with another communication device, timing to communicate data with that another communication device through the second communication channel. According to this configuration, when any communication device is found, local data communication between communication devices can efficiently be carried out by sharing timing with each other.

Another exemplary embodiment provides a communication system including a plurality of communication devices that can establish connection to an access point. Each of the communication devices is configured to perform processing for establishing connection to the access point and communicating data with the access point through a first communication channel, processing for notifying the access point of suppression of data communication, processing for data communication for a predetermined period through a second communication channel after the notification of suppression of the data communication, processing for resuming data communication with the access point through the first communication channel after data communication through the second communication channel, and processing for determining timing to perform processing for data communication through the second communication channel.

Another exemplary embodiment provides a communication method performed by a communication device that can establish connection to an access point. The communication method includes establishing connection to the access point and communicating data with the access point through a first communication channel, notifying the access point of suppression of data communication, communicating data for a predetermined period through a second communication channel after the notification of suppression of the data communication, resuming data communication with the access point through the first communication channel after data communication through the second communication channel, and determining timing to perform processing for data communication through the second communication channel.

Another exemplary embodiment provides a non-transitory computer-readable storage medium with an executable communication program stored thereon. The communication program causes a computer that can establish connection to an access point to perform establishing connection to the access point and communicating data with the access point through a first communication channel, notifying the access point of suppression of data communication, communicating data for a predetermined period through a second communication channel after the notification of suppression of the data communication, resuming data communication with the access point through the first communication channel after data communication through the second communication channel, and determining timing to perform processing for data communication through the second communication channel.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
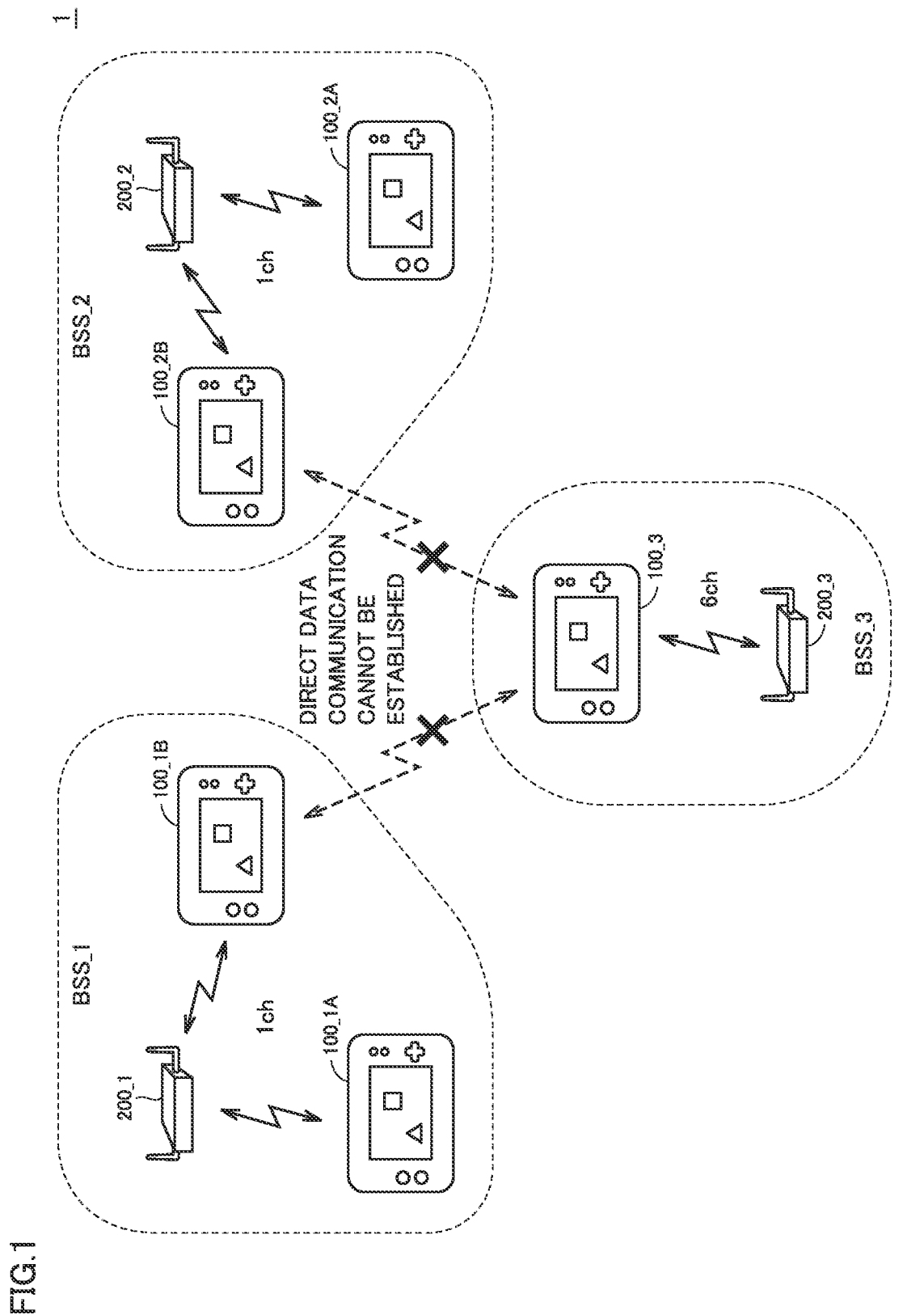
FIG. 1 shows an exemplary illustrative non-limiting drawing illustrating communication processing in a communication system according to related art.

The present embodiment will be described in detail with reference to the drawings. The same or corresponding elements in the drawings have the same reference characters allotted and description thereof will not be repeated.

[A. Overview]

Overview of a communication system 1 according to the present embodiment will initially be described.

FIG. 1 illustrates a communication system including communication devices 100_1A, 100_1B, 100_2A, 100_2B, 100_3, . . . and access points 200_1, 200_2, 200_3, . . . that can exchange information with one another through wireless communication.

In the description below, communication devices 100_1A, 100_1B, 100_2A, 100_2B, 100_3, . . . may also collectively be referred to as a "communication device 100" and access points 200_1, 200_2, 200_3, . . . may also collectively be referred to as an "access point 200." The "access point" may also be abbreviated as an "AP".

Each communication device 100 can establish connection to any access point 200 through wireless communication.

For example, a wireless local area network (LAN) in conformity with Institute of Electrical and Electronics Engineers (IEEE) 802.11 standards can be employed for wireless communication. "IEEE 802.11 standards" herein is a term encompassing not only IEEE 802.11 (defined in 1997) in the narrow sense but also all standards (for example, IEEE 802.11b, IEEE 802.11g, and IEEE 802.11n) derived from IEEE 802.11. Furthermore, "IEEE 802.11 standards" may encompass also newly derived standards that will be defined in the future.

FIG. 1 shows an exemplary communication state in an infrastructure mode defined under the IEEE 802.11 standards. In the infrastructure mode, one communication device 100 or a plurality of communication devices 100 is/are connected to access point 200. One communication device 100 or a plurality of communication devices 100 connected to the access point operate(s) as station(s) (STA). Access point 200 can also be regarded as meaning a "parent" and communication device 100 that operates as the station can also be regarded as meaning a "child".

Though FIG. 1 illustrates communication device 100 and access point 200 as devices different in type, a single communication device 100 may function as any of the station and the access point.

Communication device 100 is described below as operating as the station, unless otherwise specified.

In the infrastructure mode, one access point 200 and one communication device 100 or a plurality of communication devices 100 configure a wireless network. The wireless network in which access point 200 plays a dominant role is referred to as a basic service set (BSS). In the description below, the term "BSS" is used substantially synonymously to the "wireless network."

In the example shown in FIG. 1, access point 200_1 and communication devices 100_1A and 100_1B configure BSS_1, access point 200_2 and communication devices 100_2A and 100_2B configure BSS_2, and access point 200_3 and communication device 100_3 configure BSS_3.

In the communication system shown in FIG. 1, communication devices 100_1A, 100_1B, 100_2A, 100_2B, and 100_3 are located at positions proximate to one another and a wireless signal can be transmitted and received between any communication devices 100. Even when communication devices 100 are located at positions proximate to each other, communication device 100 belonging to one wireless network is unable to directly communicate data with communication device 100 belonging to another wireless network.

For example, communication device 100_3 belonging to BSS_3 managed by access point 200_3 is unable to directly communicate data with communication devices 100_1A and 100_1B belonging to BSS_1 and communication devices 100_2A and 100_2B belonging to BSS_2.

Thus, in the infrastructure mode in conformity with the general IEEE 802.11 standards, any communication device 100 is able to directly communicate data only with access point 200 to which it is connected and another communication device 100 belonging to a common BSS managed by access point 200 to which it is connected. In other words, communication device 100 belonging to the wireless network managed by any access point 200 is unable to directly communicate data with communication device 100 belonging to a wireless network managed by another access point 200 (regardless of whether or not communication is established through the same communication channel) and communication device 100 belonging to no wireless network.

Overview of communication processing in communication system 1 according to the present embodiment will be described with reference to FIG. 2. In communication system 1 according to the present embodiment, communication device 100 belonging to the wireless network managed by any access point 200 directly communicates data with communication device 100 belonging to the wireless network managed by another access point 200 (regardless of whether or not communication is established through the same communication channel) and communication device 100 belonging to no wireless network. At this time, communication device 100 maintains communication with access point 200 that configures the wireless network to which it belongs.

Figure 2:
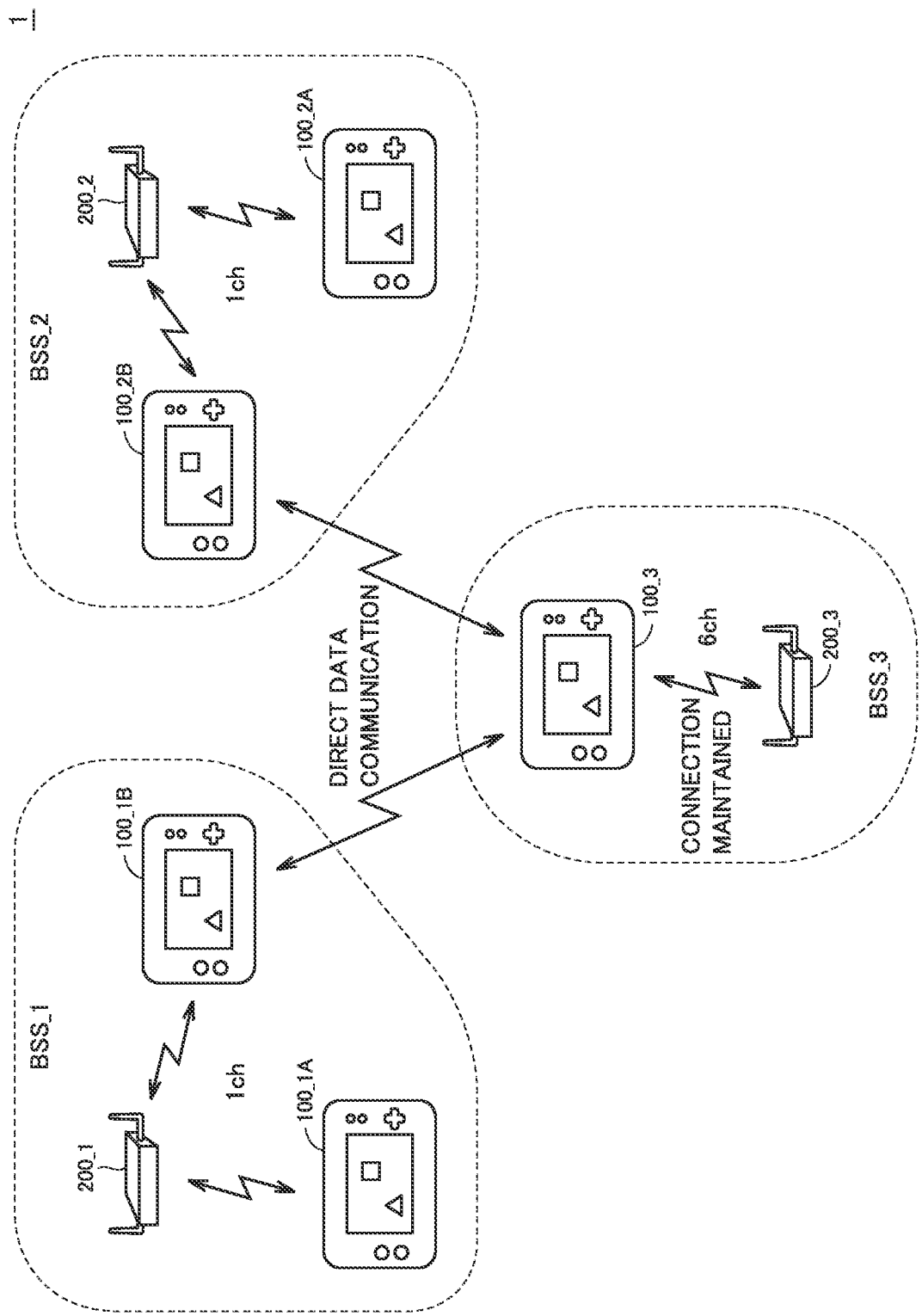
FIG. 2 shows an exemplary illustrative non-limiting drawing illustrating overview of communication processing in a communication system according to the present embodiment.

In the example shown in FIG. 2, communication device 100_3 belongs to the wireless network (BSS_3) managed by access point 200_3. BSS_3 is assumed to use 6ch as a wireless channel.

Communication devices 100_1A and 100_1B located at positions proximate to communication device 100_3 belong to the wireless network (BSS_1) managed by access point 200_1. Communication devices 100_2A and 100_2B located at positions proximate to communication device 100_3 belong to the wireless network (BSS_2) managed by access point 200_2. BSS_1 and BSS_2 are assumed to use 1ch as the wireless channel.

Communication device 100_3 belonging to BSS_3 can directly communicate data with communication device 100_1B and communication device 100_2B that belong to other wireless networks (BSSs) and are different also in communication channel. A communication method for realizing such data communication will be described below.

[B. Exemplary Hardware Configuration]

An exemplary hardware configuration of a device that configures communication system 1 according to the present embodiment will now be described.

(b1: Communication Device 100)

Any communication device may be applicable as communication device 100 included in communication system 1 according to the present embodiment. By way of example, a computer with a wireless communication function can be provided. A game device representing a typical example of the computer can be adopted as communication device 100. A portable (or mobile) or stationary game device may be applicable.

An exemplary hardware configuration of communication device 100 included in communication system 1 according to the present embodiment will be described with reference to FIG. 3. Communication device 100 represents an exemplary computer, and includes a processor 102, a main storage 104, an auxiliary storage 106, a display 114, an operation unit 116, an audio output unit 118, and a wireless communication unit 120. These components are connected to communicate data with one another through a bus 112.

Processor 102 is a processing entity that performs processing provided by communication device 100. Processor 102 reads a system program 108 and an application program 110 stored in auxiliary storage 106, develops the program on main storage 104, and performs various types of information processing as will be described later.

System program 108 includes an instruction code for implementing each type of processing as will be described later. In particular, system program 108 includes a communication program according to the present embodiment.

Main storage 104 is an arbitrary storage device (storage medium) that can be accessed by processor 102, and implemented, for example, by a volatile storage device such as a dynamic random access memory (DRAM).

Auxiliary storage 106 is implemented, for example, by a non-volatile storage medium such as a hard disk or a flash memory. Alternatively, auxiliary storage 106 may be implemented, for example, by a storage medium attachable to and removable from communication device 100 such as an optical disc and a cartridge. In this case, a combination of communication device 100 and an arbitrary storage medium may implement a communication device.

Display 114 shows an image generated as a result of information processing performed by processor 102. An image received from another device may also be shown on display 114. A plurality of displays 114 may be provided. Alternatively, communication device 100 may be configured to use a single external display or a plurality of external displays.

Operation unit 116 mainly accepts an operation from a user of communication device 100. Operation unit 116 is implemented, for example, by a push button, a control lever, a touch panel, a mouse, and the like. Operation unit 116 may be a game controller that is separate from communication device 100 and connected through a wire or wirelessly.

Wireless communication unit 120 transmits and receives data to and from another device through a wireless signal. Wireless communication unit 120 supports a wireless LAN, for example, in conformity with the IEEE 802.11 standards. In addition, wireless communication unit 120 may support a communication scheme such as Bluetooth®, ZigBee®, or infrared communication. Though FIG. 3 collectively shows a block of wireless communication unit 120, a plurality of wireless communication units 120 independent of one another may be implemented. Alternatively, wireless communication unit 120 may be integrated with processor 102.

Typically, only a single media access control (MAC) address is allocated to wireless communication unit 120. In the communication method according to the present embodiment, though use of a single MAC address is assumed, a plurality of MAC addresses may be allocated to wireless communication unit 120.

Figure 3:
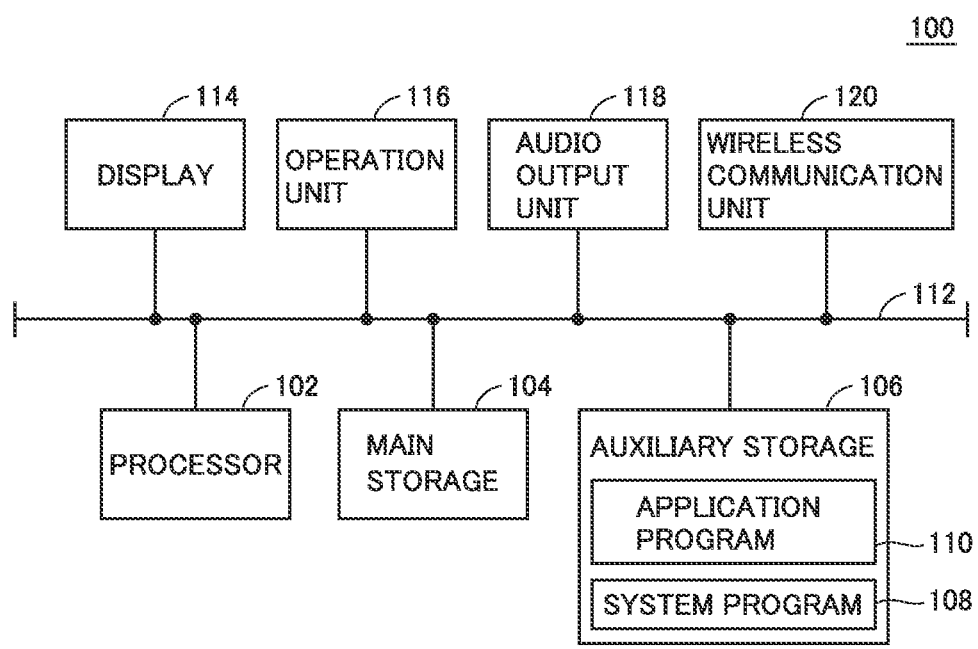
FIG. 3 shows an exemplary illustrative non-limiting drawing illustrating a hardware configuration of a communication device included in the communication system according to the present embodiment.

Though FIG. 3 shows communication device 100 as an integrated device, the communication device may be implemented as an assembly of a plurality of devices. In other words, communication device 100 may be implemented by combination of a plurality of independent devices. For example, a configuration in which a main body including hardware corresponding to processor 102, main storage 104, and auxiliary storage 106 and a terminal including hardware corresponding to display 114, operation unit 116, and audio output unit 118 are separate from each other may be adopted. Such a configuration may be referred to as a communication system, rather than communication device 100.

At least a part of information processing performed in communication device 100 may be performed discretely by another device or a plurality of other devices arranged as being distributed over a network (a wide area network and/or a local network).

(b2: Access Point 200)

Any communication device may also be adopted for access point 200 included in communication system 1 according to the present embodiment. For example, a dedicated wireless relay or communication device 100 as described above may be adopted as access point 200. Since such a device itself has been known, detailed description will not be provided.

(b3: Others)

Processing in communication device 100 and/or access point 200 may be performed by execution of a program by the processor, or a part or the entirety thereof may be implemented by hard-wired circuitry such as a system on chip (SoC), an application specific integrated circuit (ASIC), or a field programmable gate array (FPGA). A part or the entirety of the hard-wired circuitry may be implemented in wireless communication unit 120.

[C. Communication Processing]

Exemplary communication processing in communication system 1 according to the present embodiment will now be described.

Figure 4:
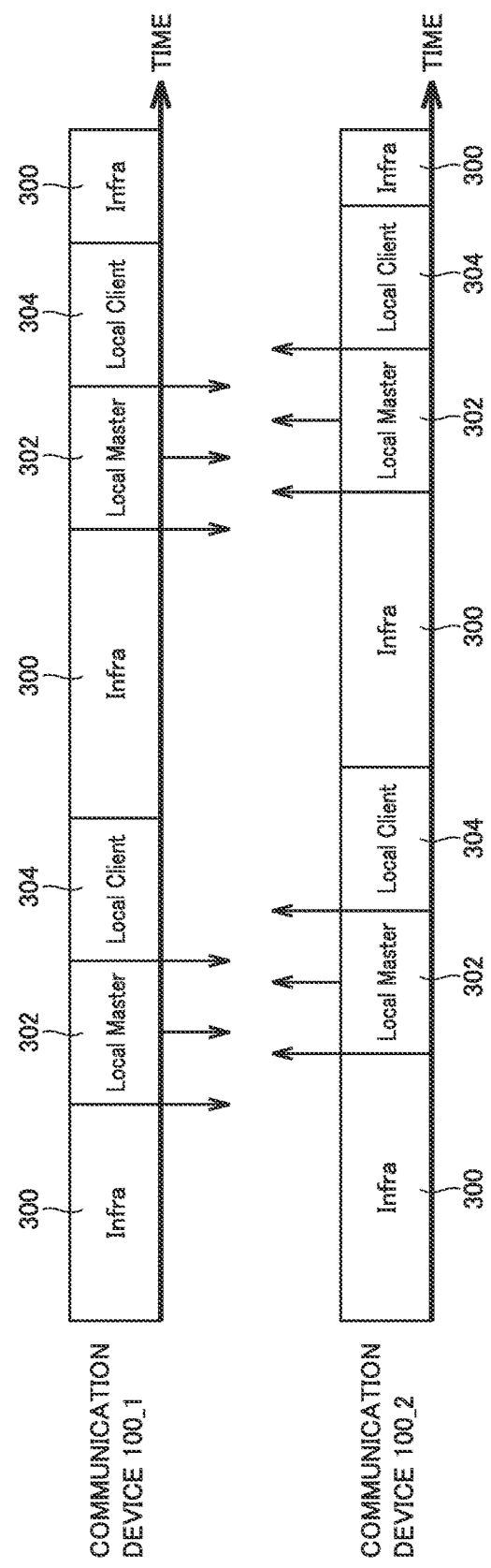
FIG. 4 shows an exemplary illustrative non-limiting time chart illustrating communication processing according to related art.

FIG. 4 is a time chart showing exemplary communication processing according to related art. Referring to FIG. 4, though communication device 100_1 and communication device 100_2 are located at positions proximate to each other, they are assumed to belong to wireless networks (BSS) different from each other.

Each of communication device 100_1 and communication device 100_2 successively switches at prescribed timing, between communication in the infrastructure mode (infrastructure communication 300) and communication (local master communication 302 and local client communication 304) for direct data communication with another communication device 100.

In local master communication 302 and local client communication 304, processing for exchanging data with simplified parent-child relation of network (simplified relation between an access point and a client) being formed. Local master communication 302 and local client communication 304 refer to a period for searching for another communication device 100 that may be located at a proximate positon, and during that period, data (a frame) involved with search is transmitted and received.

In local master communication 302, one communication device 100 as the master transmits data indicating presence thereof to another communication device 100, and in local client communication 304, one communication device 100 waits for reception of data indicating presence from another communication device 100. As one communication device 100 establishes local master communication 302 and another communication device 100 establishes local client communication 304 at certain timing, these communication devices 100 can sense presence of each other.

In communication processing shown in FIG. 4, however, infrastructure communication 300 is interrupted and local master communication 302 and local client communication 304 are established. Therefore, when infrastructure communication 300 is resumed, connection authentication processing for connection again to access point 200 to which the communication device was connected is required. Therefore, loads on access point 200 and an authentication server responsible for connection authentication processing tend to increase.

Then, in communication system 1 according to the present embodiment, communication device 100 performs communication processing for searching for another communication device 100 while it maintains communication with access point 200 that configures the wireless network to which the communication device belongs.

Figure 5:
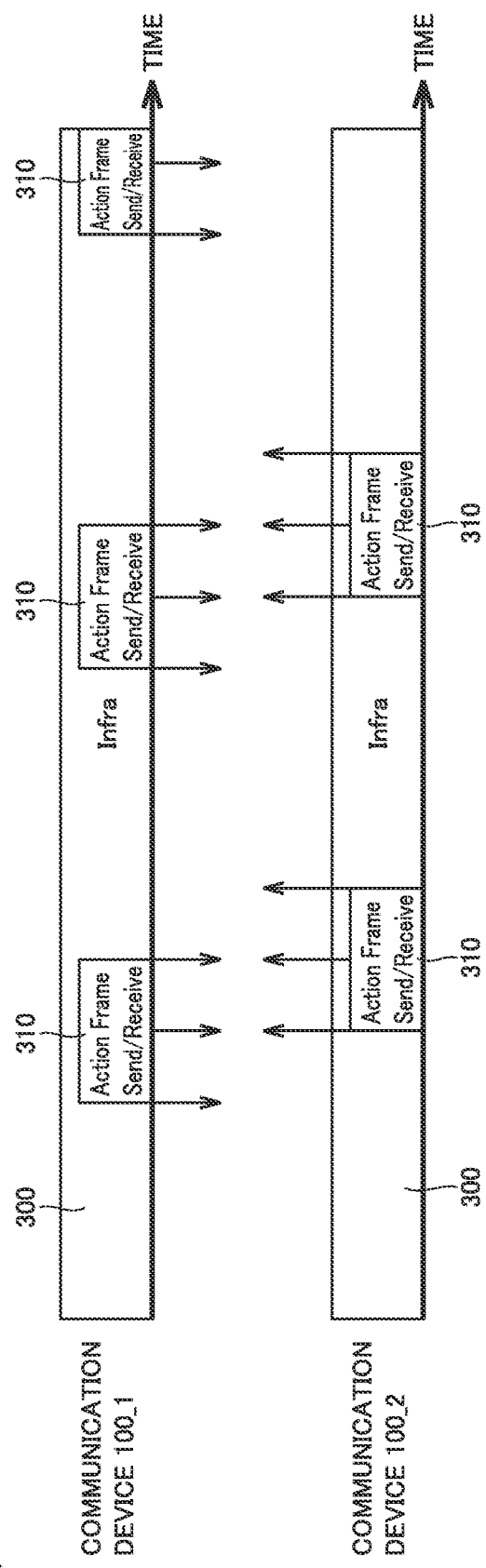
FIG. 5 shows an exemplary illustrative non-limiting time chart illustrating communication processing for establishing data communication shown in FIG. 2.

FIG. 5 is a time chart showing exemplary communication processing for establishing data communication shown in FIG. 2. Referring to FIG. 5, each of communication device 100_1 and communication device 100_2 establishes communication (search processing 310) for direct data communication with another communication device 100 at prescribed timing while it continues communication in the infrastructure mode (infrastructure communication 300).

In search processing 310, each communication device 100 transmits data toward another communication device 100 through a specific communication channel and attempts to receive data from another communication device 100. An action frame defined under 802.11 standards can be employed as data to be transmitted and received. When one communication device 100 transmits an action frame and the other communication device 100 successfully receives the action frame at certain timing, the other communication device 100 can sense presence of one communication device 100. Similarly, when the other communication device 100 transmits an action frame and one communication device 100 successfully receives the action frame at another timing, one communication device 100 can sense presence of the other communication device 100. As the action frame is successfully transmitted and received bidirectionally, both of communication devices 100 can sense presence of each other.

Figure 6:
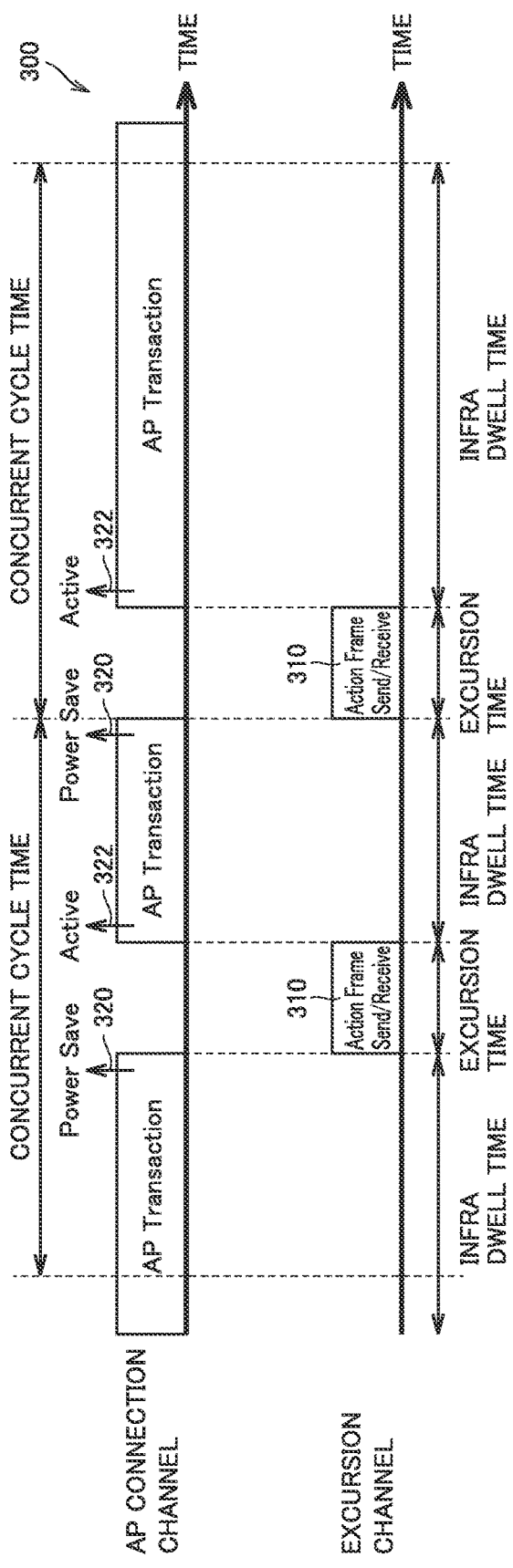
FIG. 6 shows an exemplary illustrative non-limiting drawing illustrating a more detailed procedure of communication processing in the communication system according to the present embodiment.

FIG. 6 is a diagram for illustrating a more detailed procedure in communication processing in communication system 1 according to the present embodiment. Referring to FIG. 6, communication device 100 is assumed to communicate as being connected to access point 200 through any communication channel (which is also referred to as an "AP connection channel" below). Communication device 100 establishes infrastructure communication 300 through the AP connection channel. More specifically, infrastructure communication 300 includes a transaction necessary for the infrastructure mode between communication device 100 and access point 200.

In search processing 310, communication device 100 changes the communication channel to be used to a communication channel for specific search (which is also referred to as an "excursion channel" below), and transmits an action frame for search and waits for reception of the action frame for search.

Typically, one communication channel different from the AP connection channel is determined in advance as an excursion channel. A plurality of communication channels may be determined as the excursion channel. The excursion channel may be a communication channel the same as the AP connection channel. Alternatively, a communication channel to be used for data communication with communication device 100 may be determined and the determined communication channel may be handled similarly to the excursion channel.

Execution of infrastructure communication 300 and search processing 310 is managed in a unit of a concurrent cycle time CCT. Concurrent cycle time CCT includes a time period (infra dwell time (IDT)) for which infrastructure communication 300 is activated and a time period (excursion time (ET)) for which search processing 310 is activated. Though the time period required for switching between communication channels is not shown for the sake of convenience of illustration, it is included in infra dwell time IDT and/or excursion time ET.

Figure 7:
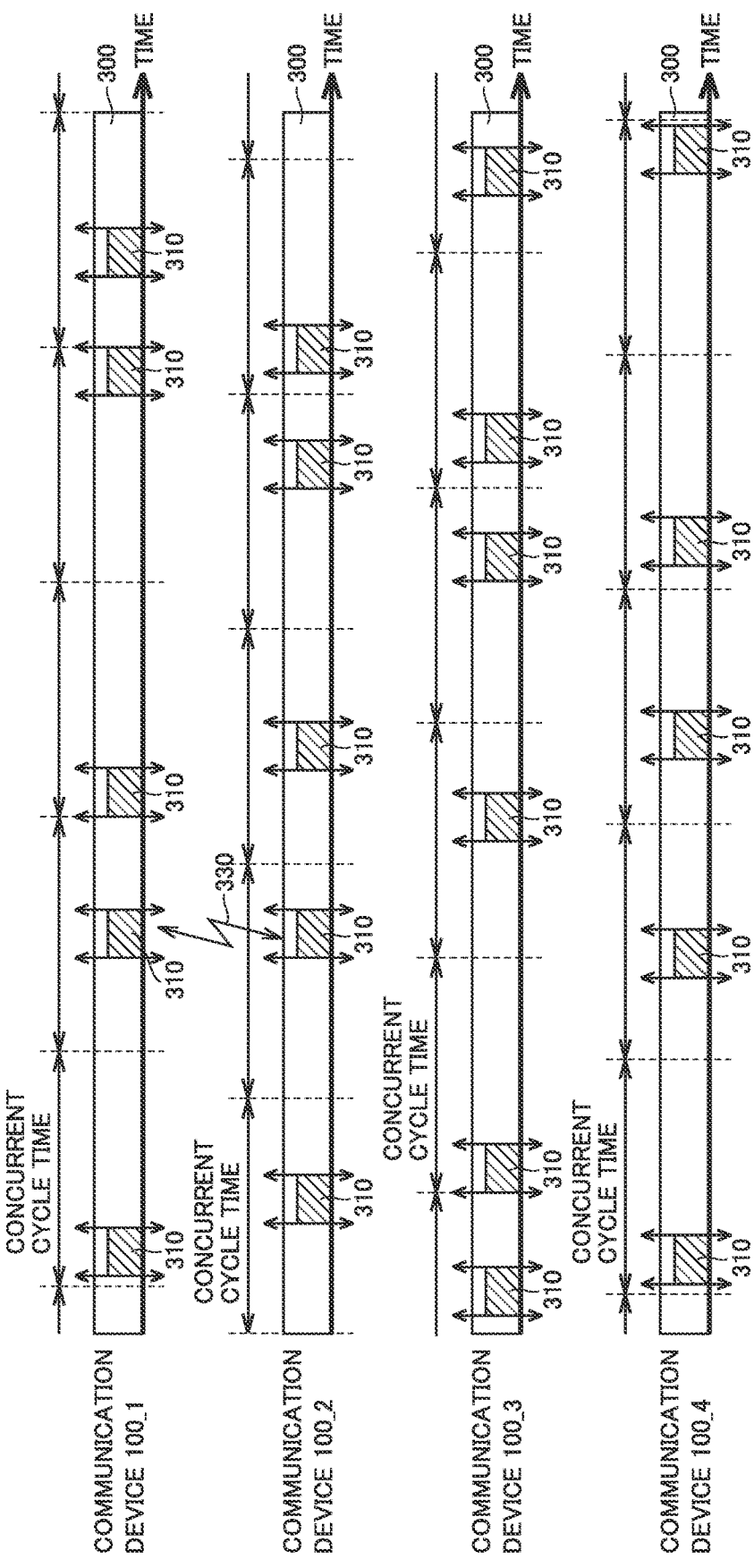
FIG. 7 shows an exemplary illustrative non-limiting time chart illustrating search processing in the communication system according to the present embodiment.

FIG. 7 is a time chart for illustrating exemplary search processing in communication system 1 according to the present embodiment. An example in which each of a plurality of communication devices 100_1 to 100_4 performs search processing 310 is shown with reference to FIG. 7.

As shown in FIG. 7, in communication processing according to the present embodiment, unless excursion times ET of the plurality of communication devices 100 coincide with each other, appropriate search cannot be conducted. Therefore, a position of start of excursion time ET (offset) in concurrent cycle time CCT may randomly be determined.

More specifically, with concurrent cycle time CCT being defined as a basic cycle, each communication device 100 randomly determines excursion time ET to perform search processing 310 by switching the communication channel to the excursion channel in each basic cycle. In other words, each communication device 100 randomly determines timing to perform processing (search processing 310) for data communication through the excursion channel every predetermined cycle time (concurrent cycle time CCT).

When excursion times ET of any two communication devices 100 coincide with each other, an action frame (any data) transmitted from one communication device 100 can be received by the other communication device 100. For example, in the example in the time chart shown in FIG. 7, data exchange 330 is successfully done between communication device 100_1 and communication device 100_2. In communication processing according to the present embodiment, an action frame is basically transmitted unilaterally. Therefore, data exchange 330 typically means that an action frame transmitted from one communication device 100 is received by the other communication device 100 and an action frame transmitted from the other communication device 100 is received by one communication device 100.

During excursion time ET, an action frame may be transmitted at timing of start of excursion time ET and timing of end of excursion time ET, and may also be transmitted at any timing within excursion time ET.

A length of concurrent cycle time CCT, infra dwell time IDT, and excursion time ET may appropriately be adjusted. Some examples of such adjustment will be described later.

In communication processing according to the present embodiment, communication device 100 searches for another communication device 100 while it maintains communication with access point 200 that configures the wireless network to which the communication device belongs. In order to maintain communication with access point 200, processing for lowering possibility of disconnection between access point 200 and communication device 100 is performed. In exemplary processing for lowering possibility of disconnection between access point 200 and communication device 100, before communication device 100 switches the communication channel to the excursion channel to perform search processing 310, communication device 100 notifies access point 200 of suppression of data communication. For example, a notification of the PowerSave mode defined under IEEE 802.11 standards can be used for such notification of suppression of data communication.

Notification of the PowerSave mode requires suspension of data transmission from access point 200 to communication device 100 which is a sender of the notification and requires change of a condition for disconnection of access point 200 from communication device 100 which is a destination of data transmission. For example, access point 200 attempts to maintain a connected state even when it is unable to receive acknowledgment (ACK) from communication device 100 which is the destination of data transmission. Therefore, notification of suppression of data communication can also be regarded as notification for loosening the condition for disconnection between communication device 100 and access point 200.

Instead of suspension of data transmission, decrease in frequency of data transmission from access point 200 to communication device 100 which is the sender of the notification may be required.

Referring again to FIG. 6, before communication device 100 switches the communication channel to the excursion channel to perform search processing 310, it notifies access point 200 of the PowerSave mode (PowerSave mode notification 320). In response to the notification of the PowerSave mode, access point 200 suppresses transmission of data to communication device 100 which is the sender of the notification. Specifically, by notifying access point 200 of the PowerSave mode in advance, connection between access point 200 and communication device 100 can be maintained and loss of data transmitted from access point 200 to communication device 100 can be reduced.

After search processing 310 ends, communication device 100 gives a notification of end of the PowerSave mode (Active notification 322). Steady data communication between communication device 100 and access point 200 can thus be resumed.

When data exchange 330 is done between communication devices 100 in search processing 310, information for establishing subsequent local data communication between communication devices 100 may be exchanged.

Figure 8:
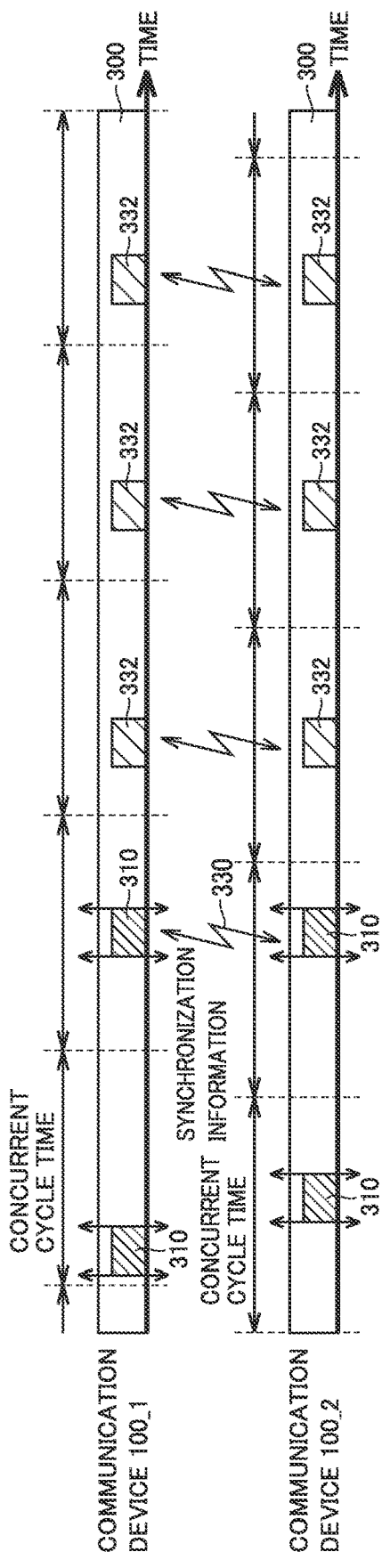
FIG. 8 shows an exemplary illustrative non-limiting time chart illustrating processing after search processing in the communication system according to the present embodiment.

FIG. 8 is a time chart for illustrating exemplary processing after search processing in communication system 1 according to the present embodiment. In the example shown in FIG. 8, information on synchronization of communication timing is exchanged in data exchange 330 between communication device 100_1 and communication device 100_2. Information on synchronization of communication timing includes timing information for local data communication between communication device 100_1 and communication device 100_2 through a communication channel (excursion channel) used in search processing 310.

By exchanging information on synchronization of communication timing between communication devices 100, communication device 100_1 and communication device 100_2 can switch the communication channel to the excursion channel to establish local data communication 332. In other words, information on synchronization of communication timing defines timing of establishment of local data communication 332 by communication device 100_1 and communication device 100_2.

As in performing search processing 310, also before start of local data communication 332, each communication device 100 may notify access point 200 to which the communication device is connected of the PowerSave mode.

Thus, when communication devices 100 located at positions proximate to each other are found in search processing 310, any data communication can be established between communication devices 100. In other words, when communication device 100 receives data from another communication device 100 through the excursion channel, it establishes connection to that another communication device 100. Each communication device 100 can maintain connection to access point 200 also in this case.

Connection between communication device 100 and access point 200 being maintained means a continued state of established connection to communication device 100 of interest from a point of view of access point 200. The IEEE 802.11 standards define a state machine that makes transition in accordance with a sequence of connection between access point 200 and communication device 100 (station). More specifically, an initial state is expressed as a state 1, and as an authentication procedure is successful, the state reaches a state 3 or a state 4 through a state 2. The state machine of access point 200 being in state 3 or 4 means a state that access point 200 and communication device 100 (station) are connected to each other. Therefore, connection between certain communication device 100 and access point 200 maintained in communication system 1 according to the present embodiment means that the state machine of access point 200 maintains state 3 or 4. As a result of notification of the PowerSave mode as described above, a condition for return from state 3 or 4 to state 1 which is the initial state becomes substantially strict and the state tends to be maintained in state 3 or 4.

[D. Processing Procedure]

A procedure of processing in communication device 100 in communication processing according to the present embodiment will now be described.

Figure 9:
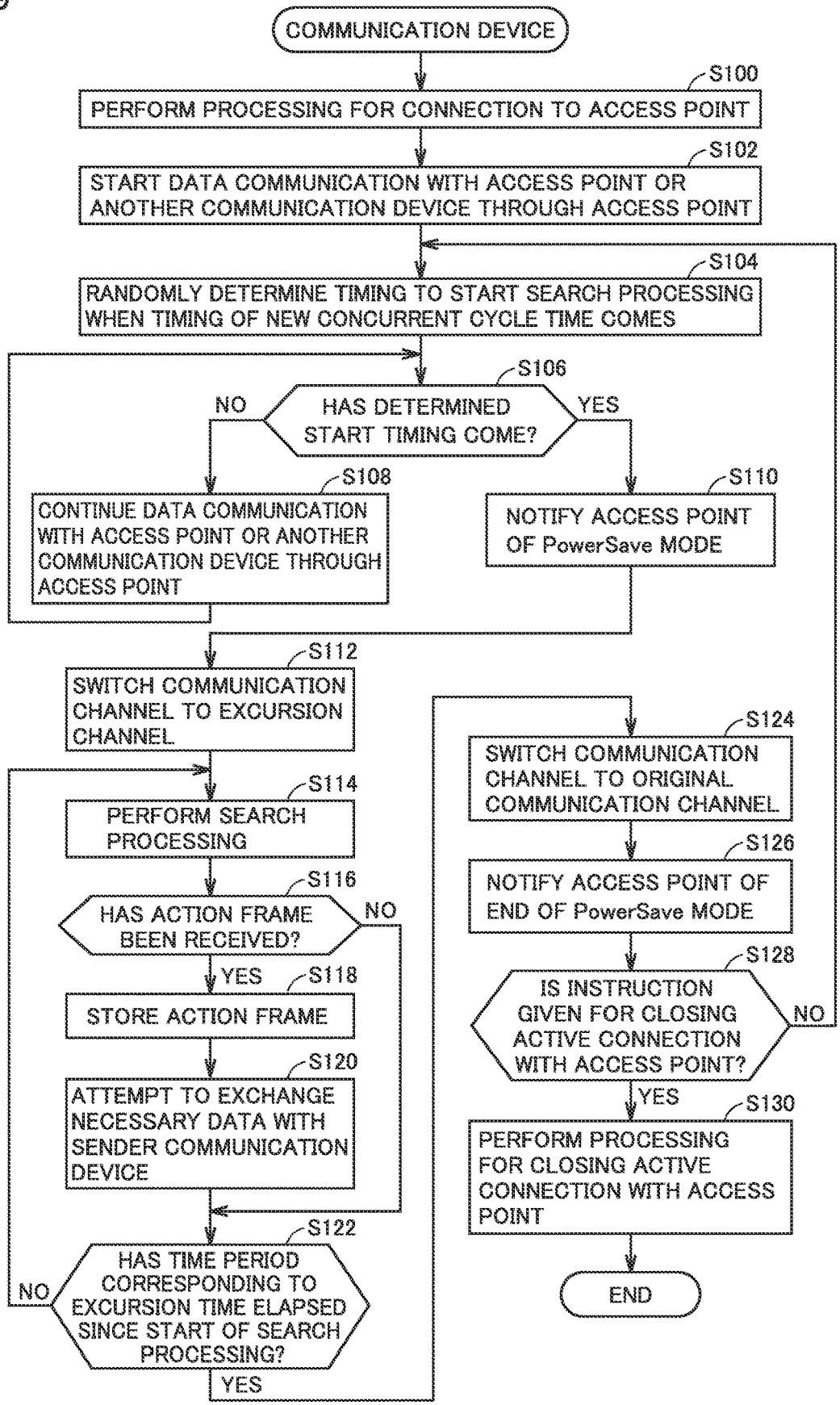
FIG. 9 shows an exemplary illustrative non-limiting flow-chart illustrating a procedure of processing in the communication device in the communication system according to the present embodiment.

FIG. 9 is a flowchart showing a procedure of processing in communication device 100 in communication system 1 according to the present embodiment. One or all of steps shown in FIG. 9 may be performed by execution of system program 108 by processor 102 of communication device 100. System program 108 includes a communication program executed in communication device 100.

Referring to FIG. 9, communication device 100 performs processing for connection to access point 200 in accordance with predetermined setting or an operation by a user (step S100). Then, communication device 100 starts data communication with access point 200 or with another communication device 100 through access point 200 (step S102).

Communication device 100 thus establishes connection to access point 200 and communicates data with access point 200 through the AP connection channel which is any communication channel.

In succession, communication device 100 determines timing to perform processing for data communication through the excursion channel. More specifically, when timing of new concurrent cycle time CCT comes, communication device 100 randomly determines timing to start search processing 310 during new concurrent cycle time CCT (step S104). Then, communication device 100 determines whether or not determined start timing has come (step S106).

When the determined start timing has not yet come (NO in step S106), communication device 100 continues data communication with access point 200 or with another communication device 100 through access point 200 (step S108). Then, processing in step S106 or later is repeated.

When the determined start timing has conic (YES in step S106), communication device 100 notifies access point 200 of suppression of data communication. More specifically, communication device 100 notifies access point 200 of the PowerSave mode (step S110).

Then, communication device 100 switches the communication channel to the excursion channel (step S112) and performs search processing 310 (step S114). In search processing 310, communication device 100 transmits an action frame to another communication device 100 and attempts to receive an action frame from another communication device 100.

Communication device 100 determines whether or not it has received the action frame from another communication device 100 (step S116). When communication device 100 has received the action frame from another communication device 100 (YES in step S116), communication device 100 has the received action frame stored (step S118). Communication device 100 attempts to exchange necessary data with another communication device 100 which is the sender of the received action frame (step S120). At this time, communication device 100 may share with another communication device 100, timing of data communication with another communication device 100 through the excursion channel (see FIG. 8 or the like described above).

When communication device 100 has not received the action frame from another communication device 100 (NO in step S116), processing in steps S118 and S120 is skipped.

Then, communication device 100 determines whether or not a time period corresponding to excursion time ET has elapsed since start of search processing 310 (step S122). When the time period corresponding to excursion time ET has not elapsed since start of search processing 310 (NO in step S122), processing in step S114 or later is repeated.

Thus, after the notification of the PowerSave mode (notification of suppression of data communication), communication device 100 communicates data over excursion time ET which is a predetermined period, through the excursion channel which is the communication channel.

When the time period corresponding to excursion time ET has elapsed since start of search processing 310 (YES in step S122), communication device 100 resumes data communication with access point 200 through the AP connection channel after data communication through the excursion channel. More specifically, communication device 100 switches the communication channel to the original communication channel (the AP connection channel which is the communication channel used for connection to access point 200) (step S124) and notifies access point 200 of end of the PowerSave mode (step S126).

Then, communication device 100 determines whether or not an instruction for closing an active connection with access point 200 is given (step S128). When the instruction for closing the active connection with access point 200 is not given (NO in step S128), processing in step S104 or later is repeated.

When the instruction for closing the active connection with access point 200 is given (YES in step S128), communication device 100 performs processing for closing the active connection with access point 200 (step S130).

Each communication device 100 independently performs the processing procedure as above.

[E. Stabilization and Optimization of Communication Processing]

Additional processing as below may be adopted for stabilizing and optimizing communication processing according to the present embodiment.

(e1: Offset of Start Timing)

Figure 10:
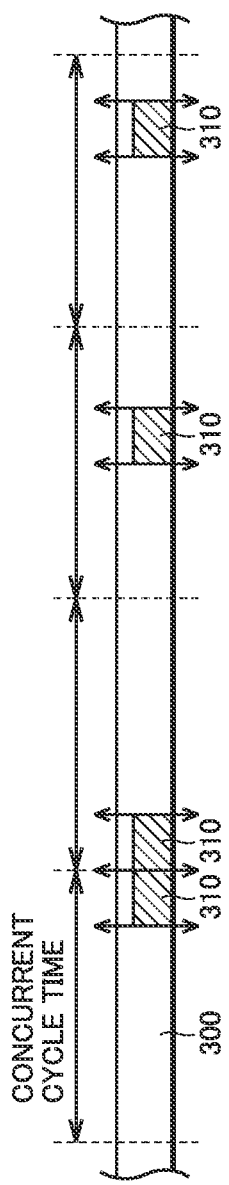
FIG. 10 shows an exemplary illustrative non-limiting drawing illustrating timing control in search processing in communication processing according to the present embodiment.

FIG. 10 is a diagram for illustrating exemplary timing control in search processing 310 in communication processing according to the present embodiment. Referring to FIG. 10, when timing to start search processing 310 is randomly determined, for example, search processing 310 may be performed at the end of certain concurrent cycle time CCT and search processing 310 may be performed at the beginning of next concurrent cycle time CCT. In this case, data cannot be transmitted from access point 200 to communication device 100 over a time period twice as long as a time period (excursion time ET) required for performing ordinary search processing 310. In other words, communication device 100 is unable to receive data from access point 200 over the time period twice as long as ordinary excursion time ET. Consequently, delay in data reception from access point 200, delay in data transmission to access point 200, or buffer overflow at access point 200 may occur.

Such an extended period during which data cannot be received may also affect an application executed in communication device 100. Then, an offset from start of concurrent cycle time CCT until timing to start search processing 310 (start of excursion time ET) may be set such that timing to start search processing 310 is not set at the beginning and at the end of concurrent cycle time CCT.

For example, when concurrent cycle time CCT is set to 500 [msec.] and excursion time ET is set to 50 [msec.], the offset before start of excursion time ET may be set within a range from 0 to 400 [msec.]. Alternatively, the offset before start of excursion time ET may be set within a range from 100 to 400 [msec.].

In other words, a prohibited section within which search processing 310 cannot be performed may be set at the beginning or the end of concurrent cycle time CCT. In this case, a position to start excursion time ET within concurrent cycle time CCT may randomly be determined within the range of the set offset. Timing to start search processing 310 may thus be set such that processing (search processing 310) for data communication through the excursion channel is performed with an interval.

(e2: Adjustment of Parameter in Accordance with Communication Condition/Communication Performance)

In communication processing according to the present embodiment, a parameter such as a length of concurrent cycle time CCT, infra dwell time IDT, and excursion time ET can be optimized as appropriate. Such a time period may be adjusted depending on a communication condition and/or communication performance.

For example, when an amount of data between access point 200 and communication device 100 is relatively large, a ratio (ET/CCT) of excursion time ET to concurrent cycle time CCT may relatively be high. In contrast, when the amount of data between access point 200 and communication device 100 is relatively small, the ratio of excursion time ET to concurrent cycle time CCT may relatively be low. For example, with concurrent cycle time CCT being set to 500 [msec.], excursion time ET may be varied as appropriate within the range from 50 to 100 [msec.].

The length of concurrent cycle time CCT may be adjusted depending on the communication condition. For example, when necessity for searching for another communication device 100 is low, concurrent cycle time CCT may relatively be long. In contrast, when necessity for searching for another communication device 100 is high, concurrent cycle time CCT may relatively be short. By varying the length of concurrent cycle time CCT, frequency to perform search processing 310 can be adjusted.

The length or the like of concurrent cycle time CCT, infra dwell time IDT, and excursion time ET may thus be adjusted depending on the communication condition. Alternatively, the length or the like of concurrent cycle time CCT, infra dwell time IDT, and excursion time ET may be adjusted depending on communication performance.

For example, data to be transmitted to communication device 100 through the AP connection channel is buffered at access point 200 while communication device 100 is performing search processing 310 (data communication through the excursion channel). Therefore, the length of excursion time ET may be set within a temporal range within which an amount of data to originally be transmitted from access point 200 to communication device 100 through the AP connection channel during search processing 310 can be buffered at access point 200. An interval between search processing 310 and adjacent search processing 310 may be set to a length over which all data buffered at access point 200 during previous search processing 310 can be transmitted to communication device 100 by the time of start of next search processing 310 since the end of previous search processing 310.

By adjusting the parameter as such, communication device 100 can receive data buffered at access point 200 during a period from after previous search processing 310 until start of next search processing 310. Consequently, buffer overflow at access point 200 can be prevented.

The length or the like of concurrent cycle time CCT, infra dwell time IDT, and excursion time ET may be determined in advance, for example, as a table, depending on an amount of data exchanged between access point 200 and communication device 100. Alternatively, the amount of data exchanged between access point 200 and communication device 100 may be compared with a threshold value determined in advance, and depending on a result of comparison, the length or the like of concurrent cycle time CCT, infra dwell time IDT, and excursion time ET may be switched. Alternatively, the length or the like of concurrent cycle time CCT, infra dwell time IDT, and excursion time ET may dynamically be calculated depending on an amount of data exchanged between access point 200 and communication device 100.

In communication system 1 capable of executing a plurality of types of applications, the length or the like of concurrent cycle time CCT, infra dwell time IDT, and excursion time ET may be switched depending on an amount of data normally required by a running application. Alternatively, in a case of an application different in amount of required data for each execution mode, the length or the like of concurrent cycle time CCT, infra dwell time IDT, and excursion time ET may be switched in accordance with the current execution mode.

The length or the like of concurrent cycle time CCT, infra dwell time IDT, and excursion time ET may be determined by successively calculating an amount of data in a running application or in an execution mode, or the length or the like of concurrent cycle time CCT, infra dwell time IDT, and excursion time ET may be determined in advance for each application or each execution mode.

(e3: Summary)

When search processing 310 is performed at random timing for a random period while communication device 100 steadily communicates data with access point 200 in the infrastructure mode, unintended packet loss and communication delay may occur. Then, timing and a length of a period may properly be adjusted.

For example, when an application executed in communication device 100 is a game, less communication delay is required, although an amount of data is small. Therefore, a time period for search processing 310 can be shorter by relatively reducing the length of concurrent cycle time CCT and excursion time ET.

[F. Functional Configuration]

A functional configuration of communication device 100 in communication processing according to the present embodiment will now be described.

Figure 11:
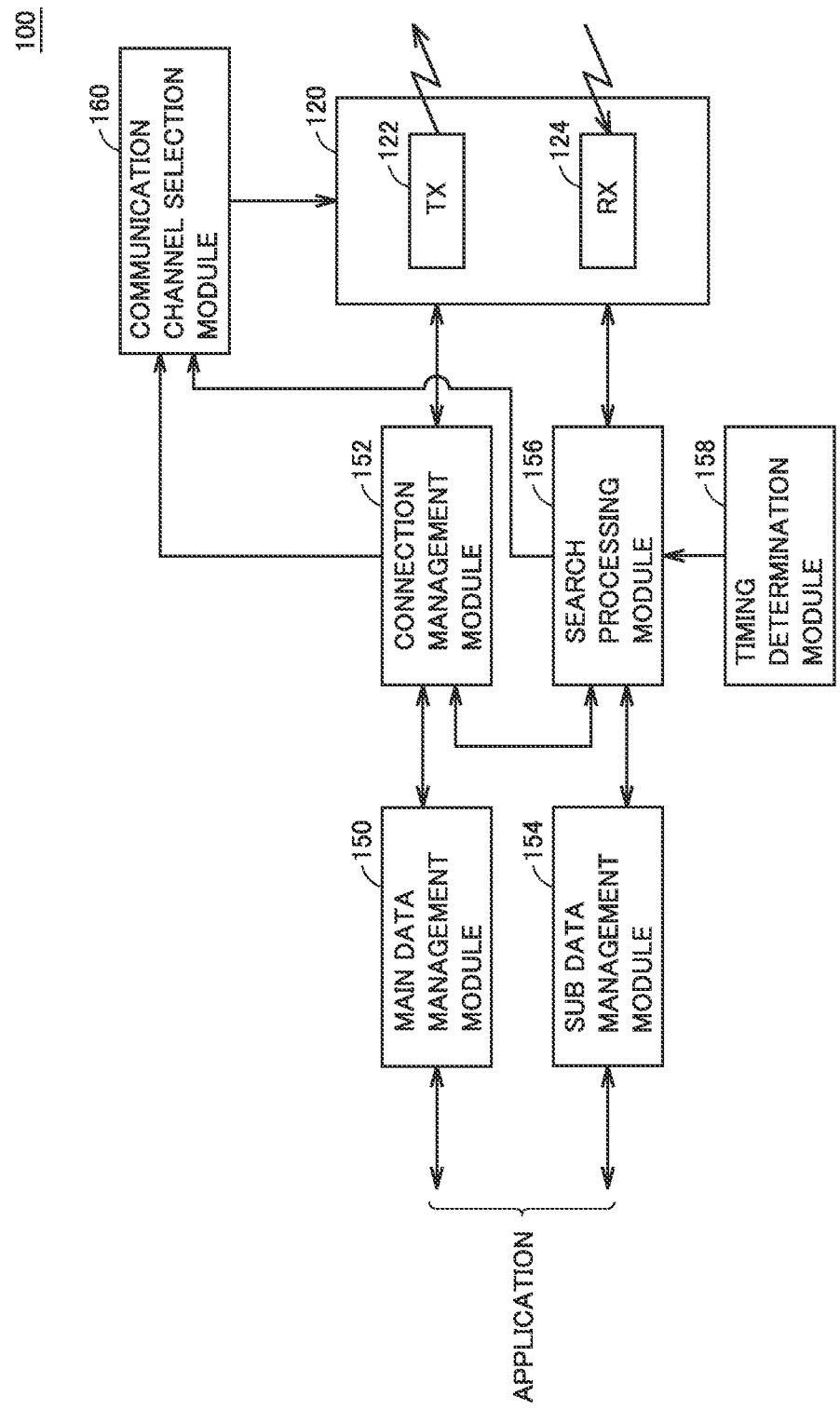
FIG. 11 shows an exemplary illustrative non-limiting drawing illustrating a functional configuration of the communication device in the communication system according to the present embodiment.

FIG. 11 is a schematic diagram showing an exemplary functional configuration of communication device 100 in communication system 1 according to the present embodiment. One or all of functional modules shown in FIG. 11 may be implemented by execution of system program 108 by processor 102 of communication device 100.

Referring to FIG. 11, communication device 100 includes, as its functional configuration, a main data management module 150, a connection management module 152, a sub data management module 154, a search processing module 156, a timing determination module 158, and a communication channel selection module 160. Wireless communication unit 120 of communication device 100 includes a transmission circuit 122 and a reception circuit 124.

Main data management module 150 manages exchange of data between any application and another communication device 100. Connection management module 152 manages establishment of connection to and disconnection from access point 200, and supplies to wireless communication unit 120, data (a frame) to be transmitted in response to a command from main data management module 150, and reconfigures data (a frame) supplied from wireless communication unit 120 to provide the reconfigured data to main data management module 150.

Sub data management module 154 manages exchange of data between any application and any communication device 100 found in search processing 310. Search processing module 156 controls execution of search processing 310. Timing determination module 158 determines timing to perform search processing 310 and notifies search processing module 156 of that timing.

Communication channel selection module 160 switches the communication channel to be used by wireless communication unit 120 in accordance with a command from connection management module 152 and search processing module 156.

Main data management module 150 and connection management module 152 are connected to access point 200 and responsible for data communication with access point 200 through the AP connection channel. Main data management module 150 and connection management module 152 resume data communication with access point 200 through the AP connection channel after data communication through the excursion channel.

Search processing module 156 is responsible for notification to access point 200, of suppression (notification of the PowerSave mode) of data communication. Sub data management module 154 and search processing module 156 are responsible for data communication over excursion time ET in the search processing after notification of the PowerSave mode.

Communication processing according to the present embodiment can be performed based on combination of such functional modules.

[G. Other Embodiments]

Though communication processing in communication device 100 connected to any access point 200 is mainly described above, communication device 100 connected to no access point 200 can also perform similar search processing 310. In other words, the communication channel may be switched to the excursion channel every any cycle time to perform search processing 310.

An exemplary implementation in which communication device 100 alone performs necessary processing is shown in the description above. Without being limited as such, the entirety or a part of necessary processing may be performed by using a computing resource (typically, a computing resource on the cloud) different from communication device 100. An appropriate form of performing processing should only be adopted depending on times.

[H. Advantages]

In communication system 1 according to the present embodiment, communication device 100 gives notification of suppression of data communication by giving notification of the PowerSave mode so as to maintain a state of connection to access point 200 through the AP connection channel and performs search processing 310 through the excursion channel. Processing for disconnection from and connection again to access point 200 through the AP connection channel does not have to be performed and processing involved with communication by communication device 100 can be simplified.

While certain example systems, methods, devices, and apparatuses have been described herein, it is to be understood that the appended claims are not to be limited to the systems, methods, devices, and apparatuses disclosed, but on the contrary, are intended to cover venous modifications and equivalent arrangements included within the spirit and scope of the appended claims.

What is claimed is:

1. A communication device comprising:
a wireless communication interface; and
a processor configured to:
   establish a wireless connection between the communication device and a first access point using the wireless communication interface and
  communicate data with the first access point through a first communication channel;
  notify the first access point of suppression of data communication;
  communicate data with another communication device using the wireless communication interface for a second time period through a second communication channel after the notification of suppression of the data communication while still being connected with the first access point, the another communication device being connected with a second access point;
  resume data communication with the first access point through the first communication channel after data communication through the second communication channel; and
  determine, randomly within at least a subset of a cycle time, a timing to search for another communication device and communicate data through the second communication channel, the cycle time having a first time period for communicating with the first access point and the second time period.

2. The communication device according to claim 1, wherein
the notification of suppression of the data communication includes notification of a PowerSave mode.

3. The communication device according to claim 1, wherein
the cycle time has at least one restriction time period where a search for the another communication device and communication through the second communication channel is forbidden.

4. The communication device according to claim 1, wherein there are a plurality of cycle times and the determination is made for each of the plurality of cycle times.

5. The communication device according to claim 4, wherein the processor is further configured to receive, when data to be transmitted to the communication device through the first communication channel is buffered at the first access point during data communication through the second communication channel, the buffered data during a period from after data communication through the second communication channel until start of next data communication through the second communication channel in a next cycle time.

6. The communication device according to claim 4, wherein
a length of the cycle time and/or a length of the second time period are/is adjusted in accordance with at least one of a communication condition and communication performance.

7. The communication device according to claim 1, wherein the processor is further configured to, when the communication device receives data from another communication device through the second communication channel, establish a connection to that another communication device via the wireless communication interface.

8. The communication device according to claim 7, wherein the processor is further configured to share with the another communication device, timing of a subsequent data communication in a next cycle time with the another communication device through the second communication channel.

9. A communication system comprising a plurality of communication devices, each of the communication devices being configured to:
establish a first wireless connection between said communication device and a first access point and communicate data with the first access point through a respective first communication channel;
notify the first access point of suppression of data communication;
communicate data with another communication device of the plurality of communication devices for a second time period through a second communication channel after the notification of suppression of the data communication while said communication device is still being connected with the first access point, and the another communication device of the plurality of communication devices being connected with a second access point without a current wireless connection with the first access point;
resume data communication with the first access point through the first communication channel after data communication through the second communication channel; and
determine, randomly within at least a subset of a cycle time, a timing to search for another communication device and to communicate data through the second communication channel, the cycle time having a first time period for communicating with the first access point and the second time period.

10. The communication system according to claim 9, wherein
the notification of suppression of the data communication includes notification of a PowerSave mode.

11. The communication system according to claim 9, wherein
the cycle time has at least one restriction time period where a search for the another communication device and communication through the second communication channel is forbidden.

12. The communication system according to claim 11, wherein there are a plurality of cycle times and the determination is made for each of the plurality of cycle times.

13. The communication system according to claim 11, wherein the respective first communication channel is different for each communication device and wherein the second communication channel is different from each of the respective first communication channel.

14. The communication system according to claim 11, wherein a length of the cycle time and the second time period is determined in real-time.

15. The communication system according to claim 11, wherein a length of the cycle time for each of the plurality of communication devices is the same.

16. The communication system according to claim 11, wherein the data communicated with the first access point is game data and wherein the second time period is less than 10% of the cycle time.

17. A communication method performed by a communication device that establishes connection to a first access point, the communication method comprising:
establishing a wireless connection to the first access point and communicating data with the first access point through a first communication channel;
notifying the first access point of suppression of data communication;
communicating data for a second time period through a second communication channel with another communication device after the notification of suppression of the data communication while still being connected with the first access point, the another communication device being connected with a second access point;
resuming data communication with the first access point through the first communication channel after data communication through the second communication channel; and
determining, randomly within at least a subset of a cycle time, a timing to search for another communication device and to communicate data through the second communication channel, the cycle time having a first time period for communicating with the first access point and the second time period.

18. The communication method according to claim 17, wherein
the notifying the first access point of suppression of data communication includes notifying the first access point of a PowerSave mode.

19. The communication method according to claim 17, wherein the cycle time has at least one restriction time period where a search for the another communication device and communication through the second communication channel is forbidden.

20. The communication method according to claim 19, wherein there are a plurality of cycle times and the determination is made for each of the plurality of cycle times.

21. A non-transitory computer-readable storage medium with an executable communication program stored thereon, the communication program causing a computer that establishes connection to a first access point to perform:

establishing a wireless connection to the first access point and communicating data with the first access point through a first communication channel;

notifying the first access point of suppression of data communication;

communicating data for a second time period through a second communication channel with another communication device after the notification of suppression of the data communication while still being connected with the first access point, the another communication device being connected with a second access point;

resuming data communication with the first access point through the first communication channel after data communication through the second communication channel; and determining, randomly within at least a subset of a cycle time, a timing to search for another communication device and to communicate data through the second communication channel, the cycle time having a first time period for communicating with the first access point and the second time period.

22. The non-transitory computer-readable storage medium according to claim 21, wherein the notifying the first access point of suppression of data communication includes notifying the first access point of a PowerSave mode.

23. The non-transitory computer-readable storage medium according to claim 21, wherein the cycle time has at least one restriction time period where a search for the another communication device and communication through the second communication channel is forbidden.

24. The non-transitory computer-readable storage medium according to claim 23, wherein there are a plurality of cycle times and the determination is made for each of the plurality of cycle times.

\* \* \* \* \*